United States Patent
Ruff et al.

[11] 3,960,322
[45] June 1, 1976

[54] SOLAR HEAT PUMP

[76] Inventors: John D. Ruff, 206 Birch St.; Phillip R. Wheeler, 209 Pine St., both of Alexandria, Va. 22305

[22] Filed: Dec. 17, 1974

[21] Appl. No.: 533,630

[52] U.S. Cl. .................................. 62/2; 62/238; 62/467 PR
[51] Int. Cl.² ........................................ F25B 27/00
[58] Field of Search .................. 62/2, 116, 238, 467

[56] References Cited
UNITED STATES PATENTS

| | | | |
|---|---|---|---|
| 1,103,440 | 7/1914 | Sellon | 62/467 PTR |
| 2,102,940 | 12/1937 | Buchanan | 62/238 X |
| 2,160,733 | 5/1939 | Henney | 62/116 X |
| 2,991,632 | 7/1961 | Rogers | 62/467 PTR |
| 3,153,442 | 10/1964 | Silvern | 62/467 PTR |

*Primary Examiner*—William E. Wayner
*Assistant Examiner*—William E. Tapolcai, Jr.

[57] ABSTRACT

A heating and cooling system which uses heat derived from solar collectors to operate a heat engine which provides operating power to drive a heat pump/air conditioning system and including capability to operate either partly or wholly on supplementary energy sources such as an oil or gas furnace or electric power, and employing positive displacement heat engine and compressor units.

13 Claims, 8 Drawing Figures

SOLAR HEAT PUMP

This invention, in cooling mode, basically uses a source of heat temperature than outside ambient (heat sink), to cause boiling of a working medium (refrigerant), and condenses the vapor product of the boiler at or around outside ambient temperature. The temperature difference between the boiler and the condenser (and the resulting vapor pressure difference) is utilized in a heat engine function of the equipment and the motive power derived in the heat engine function is then utilized to provide a compressor function by which liquid refrigerant is caused to evaporate in an evaporator at temperatures lower than outside ambient, and thus a cooling effect is achieved in a mechanical refrigeration system.

In heating mode the source of heat causes the boiler, the heat engine and the compressor to function in the same way but the uses of the condenser and evaporator are reversed in the manner of a heat pump, so that the evaporator is associated with outside ambient temperature and the condenser is discharging heat inside the heated space. In this manner a considerably larger quantity of heat is provided, than would be provided if the original source of heat, (solar, gas or oil furnace) were applied directly to heating purpose. The additional heat is derived from the outside air by the process of refrigerant evaporation in the evaporator (in the manner of a conventional heat pump).

The general principle is not new and the patent of Steuart (U.S. Pat. No. 1,871,244) is cited. But new and improved equipment with greater versatility is shown.

BACKGROUND

The present energy shortage has shown a need for conservation of all forms of depletable energy reserves and the need to utilize free sources of energy such as solar radiation. This invention provides an efficient means of providing cooling by solar power and also is capable of being operated by energy provided by a supplementary furnace. This is important at times when the sun is not shining. Another facet of this invention is that by the use of an electric motor, which is coupled to the compressor shaft, the equipment can operate as an electrically driven system. This is a useful option considering possible future shortages of gas or oil.

In heating mode the invention provides three main alternate functions:
a. Solar heating with increased heat output.
b. Heating by gas or oil with greatly increased heat output.
c. Heating as an electric heat pump.

In both cooling and heating modes the most important advantage over the other systems is that by increasing the heat output for a given solar heat input, more heat is available for storage; to be used in dull periods and at night; thus reducing the need for supplementary heat input. And when supplementary heat is needed, much less need be used.

THIS INVENTION COMPRISES

A primary high temperature boiler in which a working medium (refrigerant) such as Freon 12 is caused to boil at a relatively high temperature (and pressure) by heat derived from solar heating panels, or from a supplementary heating furnace fired by gas or oil.

A condenser in which refrigerant vapor from the boiler condenses at a lower temperature (and pressure).

A positive displacement heat engine/compressor unit in which the pressure difference between the boiler and the condenser (and the resulting vapor flow) is used to provide motive power so that a drive shaft is turned and this drive shaft transmits power to drive a compressor.

An evaporator (of the flooded type), in which refrigerant is caused to evaporate at a relatively low temperature and pressure, by the suction of the compressor.

An electric motor coupled to the compressor drive shaft which can be used to start rotation of the heat engine/compressor system and which can be the sole source of power for the compressor when there is insufficient pressure in the boiler.

A system of changeover dampers that switch air flow over the evaporator and the condenser between outside air and inside air when changing between cooling and heating of the building. This being in the manner employed with some conventional heat pumps.

An alternate changeover system (between heating and cooling operation) which uses changeover valves in the refrigerant circuit to change an outside coil and an inside coil between condenser and evaporator functions in the manner commonly used with conventional heat pumps.

An auxiliary evaporator used in heating operation (during supplementary furnace operation) which uses solar heated water as a heat source thus providing evaporation at higher suction pressure (with better efficiency) at times when the solar heated water does not contain enough heat to operate the boiler.

Means of operating the boiler as an auxiliary evaporator when the system operates as an electrically driven heat pump.

A system of oil recovery whereby oil trapped in the evaporator and boiler is periodically returned to the oil sump of the heat engine/compressor.

A system of regulated actuation of the inlet and exhaust valves controlling the flow of high pressure vapor from the boiler through the positive displacement heat engine, by which means various pressures in the boiler and condenser are compensated for efficient operation. And the valve system being adaptable so that the heat engine function can be terminated when there is insufficient pressure in the boiler; and the components of the heat engine function are then used to extend the compressor capacity (when being used as an electrically powered heat pump).

A specialized pressure lubrication of the positive displacement heat engine cylinder walls, (and special piston design) to overcome oil dilution by liquid refrigerant.

A system of control associated with a water storage tank, which automatically stores warm water when the available solar heating output is more than adequate and which introduces this stored water into use when it is needed.

DESCRIPTION

Basic Function (solar powered cooling)

Figure 1:
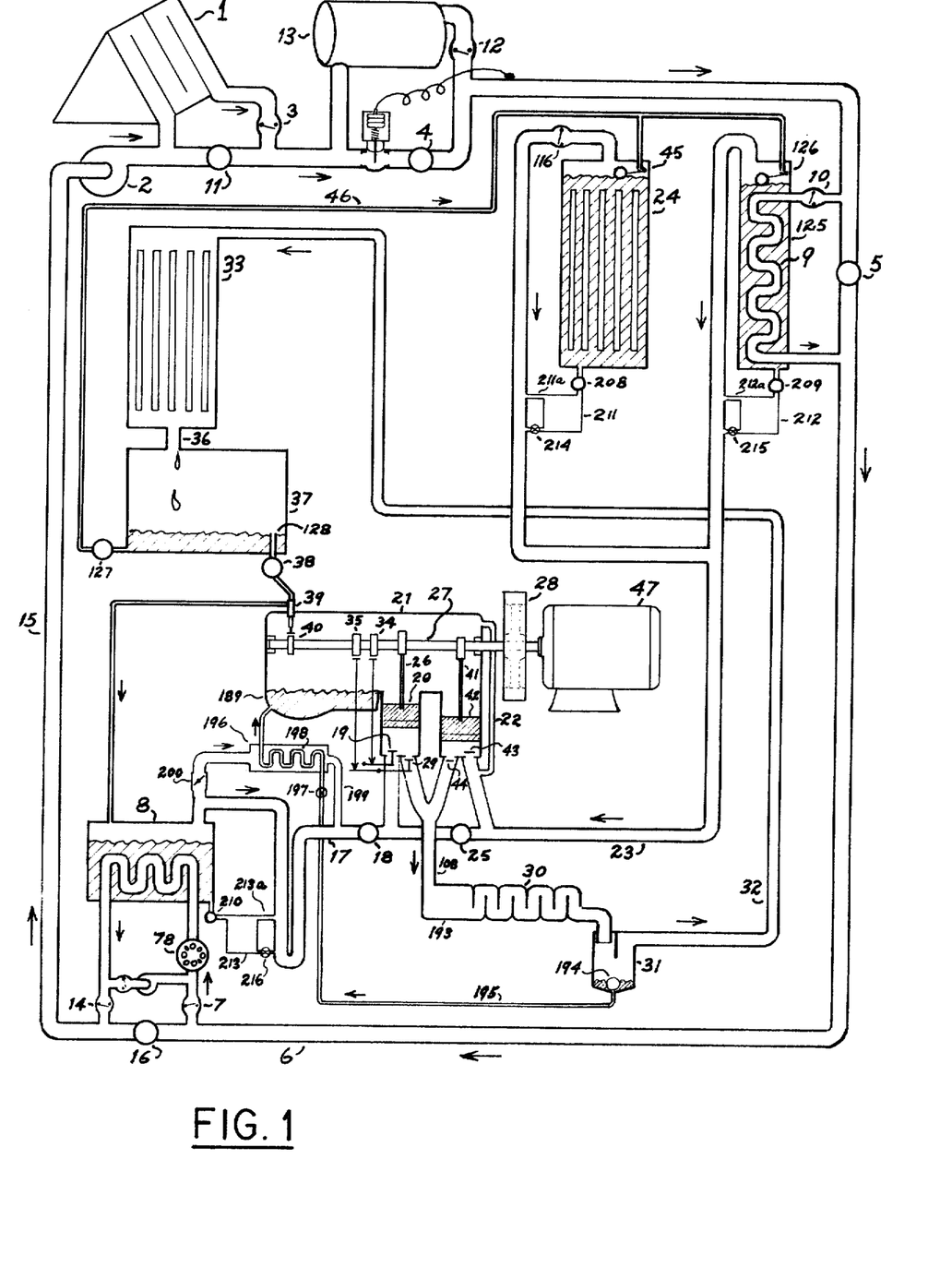
FIG. 1 shows basic system operation.

FIG. 1 shows solar collector panel 1 through which pump 2 causes water (or any other suitable fluid) to flow. This water is heated by solar radiation as it flows through the panel and then flows through check valve 3, through stop valves 4 and 5, through pipe 6 and through check valve 7 to boiler 8. In basic function, valve 5 is kept open so there is no flow through coil 9, since check valve 10 is lightly loaded and needs some pressure to open it; (closing of stopvalve 5 would force flow through coil 9 and checkvalve 10). Stopvalve 11 is kept closed in basic operation and flow is forced through panel 1 and checkvalve 3. Similarly stop valve 4 and checkvalve 12 are used to control flow through storage tank 13. Water from boiler 8 flows out through check valve 14 and returns through pipe 15 to pump 2 for re-circulation. Valve 16 is kept closed during basic function so that the solar heated water is forced through boiler 8. The temperature in boiler 8 is thus maintained at a level higher than outside air. A quantity of liquid refrigerant is maintained in boiler 8. When refrigerant boils in boiler 8 the pressure is transmitted through boiler pipe 17, through trottle valve 18, through inlet valve 19, and to the underside of piston 20. The topside of piston 20 is exposed to the pressure existing in crank case enclosure 21 which is connected to pipe 22 to suction line 23 which connnects to evaporator 24, in which the pressure is less than the pressure in boiler 8. Then, since the top side pressure on piston 20 is less than the underside pressure it will tend to move upward in a power stroke. Stopvalve 25 is kept closed in basic operation. Piston 20 is connected by rod 26 the crankshaft 27 which is caused to rotate by the powerstroke. Flywheel 28 maintaians momentum and after top dead center, piston 20 goes downward on an exhaust stroke and pushes vapor through exhaust (discharge) valve 29, through mixing coil 30, into oil separator 31, then through discharge pipe 32 and to condenser 33. The power and exhaust strokes are repeated in a cycle, and rotation of crankshaft 27 continues. Valves 19 and 29 are controlled by cams 34, 35 so that inlet valve 19 is only open during the power stroke and exhaust valve 29 is only open during the exhaust stroke. Refrigerant vapor condenses in condenser 33 and liquid drains through pipe 36 into receiver 37, and through liquid line solenoid valve 38 to injector pump 39 which injects liquid into boiler 8 and thus a heat engine cycle is maintained. Injector pump 39 is a reciprocating pump activated by cam 40 but could alternately be a gear pump or any other type of injector (boiler feed) pump.

Crankshaft 27, through rod 41 actuates compressor piston 42 which draws vapor on its upward (suction) strokes through inlet valve 43, through suction line 23 from evaporator 24. On downward (compression) strokes piston 42 forces the vapor through discharge valve 44, and to mixing coil 30 where it mixes with vapor from the heat engine and then travels to condenser 33. Evaporator 24 is of the flooded type and float valve 45 maintains liquid level by supplying refrigerant through liquid line 46 from receiver 37. The suction induced in evaporator 24 causes evaporation at relatively low temperature. Air (or water) flow over evaporator 24 carries the cooling effect to the space to be cooled. In cooling function, heat in condenser 33 is rejected to outdoor heat sink, usually air.

Electric motor 47 is direct coupled so that it can drive the crankshaft 27. When the system is being started from a stopped position, the windings of motor 47 are energized and rotation of crankshaft 27 (and flywheel 28) is thus established. Then as rotation speed is reached the heat engine provides motive force and the windings are then de-energized, and the motor does not provide any motive power although the rotor continues to rotate (being a permanent extension of crankshaft 27). When the temperature of the water supplied to heat boiler 8 is insufficient (due to cloudy conditions) to provide the required power from the heat engine, the rotation speed of crankshaft 27 decreases and the motor windings can then be re-energized and motor 47 provides motive power to operate the compressor. An alternate source of supplementary power is to use a gas or oil fired furnace to keep boiler water at operating temperature. A detailed description of the control of the system follows.

CONTROL SYSTEM

Figure 2:
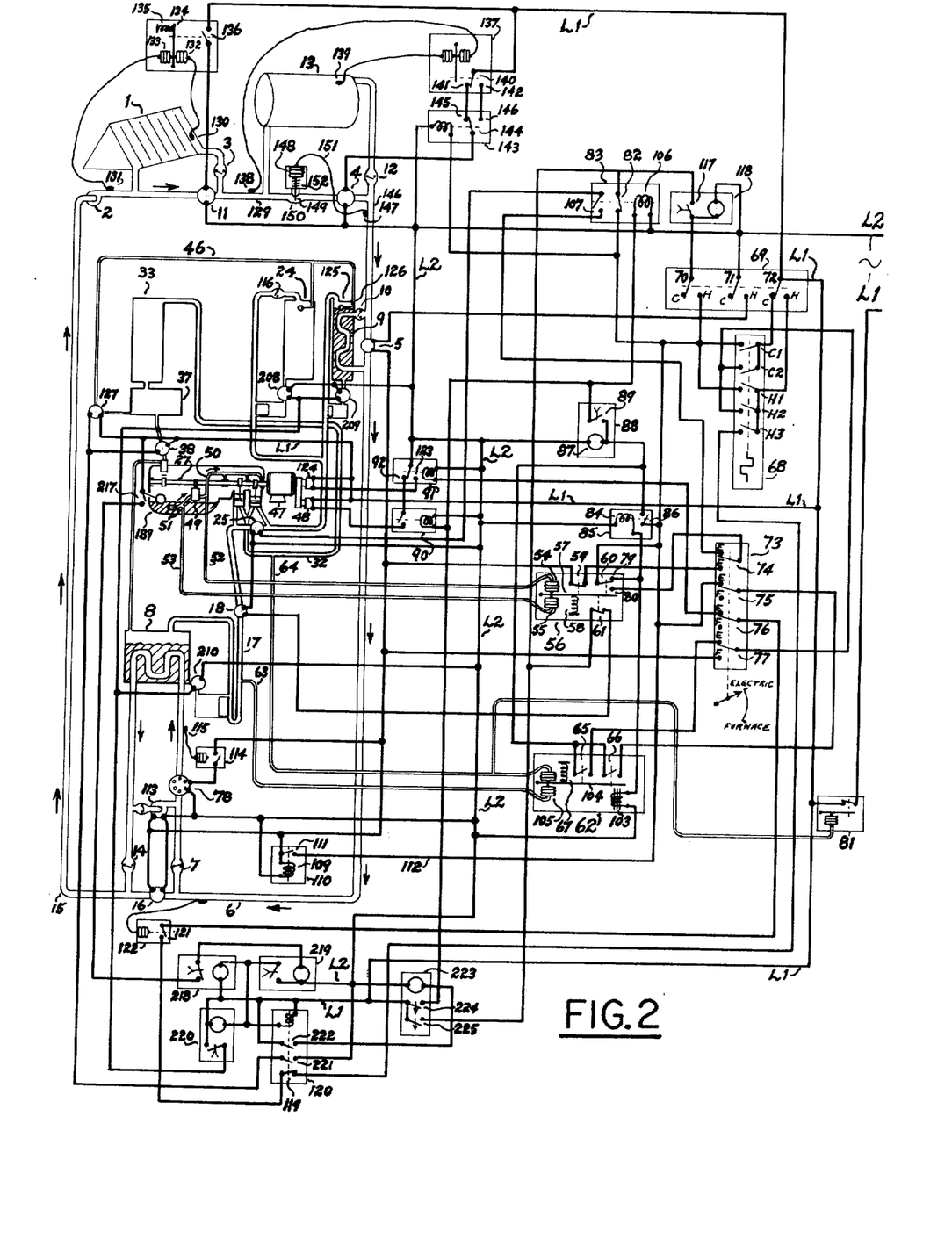
FIG. 2 shows the operation of the electrical control system.

FIG. 2 shows motor 47 coupled to crankshaft 27 of the heat engine/compressor unit. Terminal block 48 is the connection point of electrical power to the motor when it is used in normal speed operation (such as with the windings connected to give 8 pole operation at around 875 R.P.M. The number differential motor poles used need not necessarily be 8 pole, but can be whatever number of poles are appropriate for the design of the engine/compressor unit. the crankshaft Oil pump 49 is driven by crankshaft 27 and delivers oil at pressure through pipe 50 to the engine/compressor unit, bearing surfaces, and oil is returned to pump 49 from the sump of the engine/compressor unit by pipe 51. Connection is made from pipes 50, 51 (through pipes 52, 53) to bellows 54, 55 of different pressure controller 56, and both bellows contact pivot bar 57. Net oil pressure from pump 49 causes movement of pivot bar 57 against control spring 58 which is compressed by this movement. Pivot bar 57, then, has a range of movement and its position at any time is representative of net oil pressure (i.e. difference between oil pump inlet and discharge pressure); and since oil pressure varies as the rotation speed of the pump (a detailed explanation is given later in this disclosure), the rotation speed of thecrrankshaft 27 ultimately determines the position of pivot bar 57. Switches 59, 60, 61 are activated by pivot bar 57 at different positions in its range of movement, and provide means of detecting various rotation speeds. Alternate means of detecting rotation speed could be used such as a centrifugal governor.

Differential pressure controller 62 senses the degree by which the pressure in boiler 8 exceeds the pressure in condenser 33. This pressure is generally called boiler pressure. Control line 63 connects to boiler pipe 17 and control line 64 connects to discharge pipe 32. Switches 65, 66 are set to operate at differing differential pressures. Control spring 67 controls sensitivity.

Thermostat 68 senses room temperature and has two stages of cooling (C1, C2) and three stages of heating (H1, H2, H3). Cool/Heat selector switch 69 has three ganged switches 70, 71, 72.

Selector switch 73 has four ganged switches 74, 75, 76, 77 which can be set to the E (Electric) or the F (Furnace) position. The "Electric" position is used when all supplementary (non-solar) energy is to be supplied as electric power to motor 47 to drive the compressor as a cooling (or heat pump) refrigeration system. The "Furnace" position is used when supplementary energy is supplied by gas or oil to heat furnace 78.

Typical operating settings of differential pressure controller 56 have switch 59 make on drop at 10 P.S.I. net oil pressure, and break on rise at 15 P.S.I. oil pressure. Switch 60 is double throw and makes to contact 79, on drop, at 8 P.S.I. and makes to contact 80, on rise, at 18 P.S.I. Switch 61 is an overspeed safety and is normally closed, but opens on rise at 35 P.S.I. oil pressure and closes on drop to 30 P.S.I. (typical settings). Typical operating net oil pressure is 20 P.S.I. at normal speed.

Typical operating settings of differential pressure controller 62 have switch 65 make on drop at 39 P.S.I. differential (between boiler and condenser pressure), and break on rise at 40 P.S.I. differential. Switch 66 typically makes on drop at 0 P.S.I. differential, and breaks on rise at 7 P.S.I. differential.

OPERATION

First Stage Cooling (with "Electric" supplementary)

Figure 3:
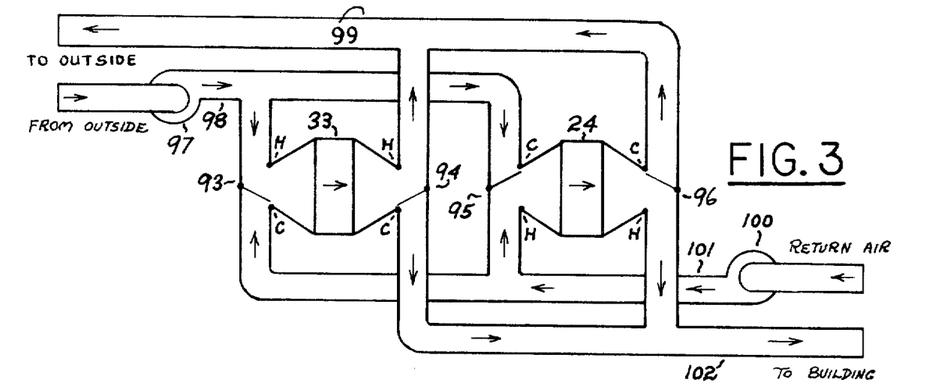
FIG. 3 shows a heat/cool changeover system utilizing air dampers.

FIG. 2 shows electric power supplied at L1, L2. Current flows from L1 through head pressure switch 81 (which is normally closed) to switch 72 of Cool/Heat selector 69 (which is set in the Cool "C" position) and to first stage switch C1 of thermostat 68. Assume that only this first stage makes. Current then flows from C1 through the normally closed contacts 82 of relay 83, through switch 61 in controller 56, and to throttle solenoid valve 18 and then returns to L2. Thus valve 18 is energized (and is opened). Any pressure in boiler 8 is applied to the heat engine. If the heat engine piston is stopped near the start of a power stroke, motion may be started immediately valve 18 opens, and operation would continue as already described (provided boiler pressure was adequate). However, assume that the heat engine was stopped in the exhaust stroke and (even through boiler pressure were adequate at 20 P.S.I.) the engine would not start without assistance. Since there would be no oil pressure delivered from oil pump 49 with the engine stopped, the switch 60 of differential controller 56 would be made to contact 79. So current would flow through this switch from switch C1 to energize coil 84 of relay 85 causing contacts 86 to close. Current then flows through contacts 86 to energize coil 87 of time delay relay 88. After a time delay (typical 2 minutes) contacts 89 are made and motor contactor relay 90 is energized causing motor 47 to run, at normal speed, (typical 875 R.P.M.). Relay 91 is not energized and its switch contact is made to contact 92 (the normally closed contact) thus providing connection to L2. As the motor gains speed oil pressure will mount and at 18 P.S.I. switch 60 will break from contact 79 and thus relay 90 is de-energized, interrupting current feed to motor 47. But engine rotation has now been established and will continue (while boiler pressure is adequate) as already described. While relay 90 is energized, relay 83 also is energized and the normally closed contacts 82 are opened thus causing throttle valve 18 to close briefly, but when speed is reached (and motor 47 then is de-energized) the throttle valve 18 opens and pressure from the boiler is applied to keep the engine running. In this cooling operation air from outside is passed over condenser 33 and air from inside the building is circulated over evaporator 24. FIG. 3 shows means of controlling air flow by dampers 93, 94, 95, 96 each of which can be set in cool C or heat "H" position. FIG. 3 shows dampers set in cool C positions. Outside air is propelled by fan 97 into duct 98 where it flows through damper 93, through condenser 33, through damper 94 into duct 99 and back to the outside air. Return air from inside the building is propelled by fan 100 into duct 101, through damper 95, throuh evaporator 24, through damper 96 and into duct 102 which delivers this cooled air to the building for cooling purposes. The rotation speed of the engine/compressor is determined largely by boiler pressure but is also effected by the temperatures of the evaporator and the condenser. In some situations there is a tendency to overspeed. Should this occur oil pressure rises to about 35 P.S.I. and opens switch 61 (FIG. 2) which causes throttle valve 18 to close, allowing the engine to slow down. Throttle valve 18 opens again when speed drops and thus the rotation speed is regulated to a high level limit.

When the first stage cooling section of thermostat 68, is satisfied, the C1 switch opens and throttle valve 18 then closes. Pressure is thus removed from the engine and it stops. As the engine stops switch 60 makes to contact 79 (the start position) but with C1 open there is no circuit to L1, so motor 47 does not start.

Assume now that first stage cooling thermostat C1 will make (with selector 73 set for "Electric") but that boiler pressure is only 4 P.S.I. (differential between boiler and condenser) which is insufficient to power the engine. With the engine at rest (before C1 makes) switch 66 in controller 62 would not be made since it is set to make at 0 P.S.I. (differential) which of course is lower than the existing 4 P.S.I. Then when C1 makes, current flows through switch 60 to contact 79, and through relays 85, 88 as already described to energize motor 47. But current also flows from contact 79 through over-ride solenoid 103 in controller 62. Solenoid 103 pulls on pivot bar 104 and over-rides the pressure in bellows 105 (which connects to boiler 8). Switches 65, 66 are thus made, positively, every time the engine is started up. When time delay contacts 89 make, and motor 47 causes the engine to rotate, switch 60 breaks from contact 79 and solenoid 103 is de-energized. Without the over-riding influence of solenoid 103 controller 62 now operates according to its functional settings (i.e. switch 66 will break on rise of boiler pressure at 7 P.S.I.). But since boiler pressure is now only 4 P.S.I., switch 66 remains made. Current then flows from C1, through the E contact of switch 75 (in selector 73), through switch 66 and to the coil 87 of time delay 88 which is thus kept energized, and motor 47 remains energized. In this manner the heat engine motive power is replaced by motive power from motor 47 when boiler pressure is lower than the break setting of switch 66 (typical 7 P.S.I.). Contacts 89 thus keeps motor 47 running continuously, and simultaneously contacts 89 feed current to coil 106 in relay 83. With relay 83 thus energized contacts 82 are open, interrupting current flow to throttle valve 18 which then closes. Also, with oil pressure established switch 60 makes to contact 80 and current flows from C1, through switch 60 (and contact 80), through switch 74 (in the E position), through contacts 107 (in relay 83 which is now energized) and to stop valve 25 which is thus energized and opened. The reason for closing throttle valve 18 and opening stopvalve 25 while motor 47 is running continuously (in cooling operation) is shown by referring to FIG. 1 and the following paragraph.

FIG. 1 shows motor 47 driving crankshaft 27 continuously as already described. Since boiler 8 is not now producing sufficient pressure to be useful, valve 18 is closed and the boiler is shut off from the heat engine. At the same time valve 25 is opened, so that suction line 23 is connected to the intakes of both cylinders through inlet valves 19 and 43, and since both discharge valves 29 and 44 discharge into the same discharge pipe 108, the heat engine cylinder has now been effectively converted into an additional compressor cylinder so that there is now, in effect, a two cylinder compressor, direct driven by motor 47. The control of valves 19 and 29 by cams 34 and 35 as described for heat engine operation is also generally appropriate for compressor operation since inlet valve 19 is only open during upward (intake) strokes of piston 20, and discharge valve 29 is only open during downward (discharge) strokes of piston 20. However some refinement of the control of valves 19 and 29 is shown in detail in a later part of this disclosure. So, with the boiler shut off (by valve 18) and with motor 47 driving a two cylinder compressor which draws vapor from cooling evaporatorr 24, and compresses into condenser 33, the system is operating as a conventional electric air conditioning system (while boiler heat is insufficient). While the system is running in this manner there could be an increase of heat output from solar panel 1 (due to a return of sunny conditions). The water reachine boiler 8 would be warmer and boiler pressure would increase causing switch 66 (FIG. 2) to open. Relays 88, 83 and motor 47 (FIG. 2) would be de-energized, throttle valve 18 would be opened and stop valve 25 closed and the system would revert back to the heat engine operation already described. Should boiler pressure drop again during heat engine operation slows down until switch 60 (FIG. 2) makes to contact 79, energizing time delay relay 88 to energize motor 47 again. Time delay relay 88 is used to prevent too frequent startings of motor 47. When first stage thermostat C1 is satisfied (and opens) it can be seen (in FIG. 2) that current flow to relays 85, 88 is interrupted so motor 47 and throttle valve 18 are de-energized, and the system stops.

Second Stage Cooling (with "Electric" supplementary)

When operating in first stage cooling (as already described) with the heat engine functioning but at relatively low boiler pressure (such as 10 P.S.I.) the compressor rotates relatively slowly (compared to the rotation speed at 40 P.S.I. boiler pressure, for example). As a result the suction pressure in the evaporator (and thence evaporator temperature) is higher than it would be at full capacity. The ability to run at low boiler temperatures is very important and can be used to great advantage to use up stored heat, since sensible heat level in the storage medium is gradually reduced while power conversion proceeds and the maximum utilization of heat energy is obtained if power conversion still continues down at low sensible heat levels. The cooling output at low heat levels is of course reduced, but, fortunately, low heat levels usually co-respond to cloudy (or night) periods when a reduced cooling capacity is required. However occasions still occur when (with a slow running heat engine) sufficient cooling is not being provided. Assume a boiler pressure of 10 P.S.I. (with cooling load greater than heat engine operation output). Then, as room temperature rises, the second stage C2 of thermostat 68 makes and current flows through switch 77, through switch 65 and to time delay relay 88 to energize motor 47, to run continuously as an electrically powered system in the manner already described. Switch 65 is set to make on drop at 39 P.S.I., and would be made. However should solar heat build up and boiler pressure increase to 40 P.S.I. then switch 65 would break and the system revert back to heat engine operation as already described. When second stage C2 is satisfied it opens and the system is back in first stage (cooling).

First Stage Cooling (with "Furnace" supplementary)

Referring to FIG. 2, when first stage C1 makes and with adequate heat supplied to the boiler the system will start and run as heat engine exactly as already described with Electric supplementary. But if boiler heat becomes inadequate the engine slows down and at 10 P.S.I. net oil pressure switch 59 in controller 56 makes. At this oil pressure, switch 60 is still made to contact 80 and, since operation is with Furnace supplementary, selector switch 73 is set in the Furnace position so that switch 74 is in the "F"position. So then current flows from C1, to switch 60, (through contact 80), to switch 74 (through F contact), through switch 59 to energize coil 109 in relay 110. With coil 109 energized contacts 111 are made, and since contacts 111 connect directly to switch C1 (through wire 112), relay 110 is then effectively latched and will remain latched regardless of the functions of switches 59 and 60 (as long as switch C1 remains made). Thus (while relay 110 is latched) a continuous source of current is provided to energize pump 113, stop valve 16 and to energize hot water furnace 78 (under control of thermostat 114 (with bulb 115 on discharge water pipe). When stop valve 16 is energized, it opens, allowing water flowing in pipe 6 to pass through it (instead of circulating through boiler 8). When pump 113 starts it induces a pressure reduction at its intake which closes checkvalve 14, and a pressure increase at its discharge which closes checkvalve 7. In this manner the circuit of water flowing through boiler 8 (and pump 113) is isolated from the water from solar panels which flows through pipe 6 annd valve 16. When the hot water furnace 78 is energized it heats the water flowing in the boiler circuit until a predetermined temperature is reached, then thermostat 114 de-activates furnace 78. On drop in water temperature thermostat 114 again makes and by thus cycling, a predetermined boiler water temperature is maintained. A typical water temperature is 190°. With heat thus maintained in the boiler the system will continue to run on heat engine power as long as switch C1 is made. Water circulating from solar panel 1 (now isolated from the boiler) may raise in temperature during operation, due to return of sunny conditions, but such raise of temperature will not cause any change in the control of the water circuits while relay 110 remains latched. When thermostat switch C1 is satisfied (and opens) relay 110 is unlatched, valve 16 closes, pump 113 stops, furnace 78 is de-energized and water from solar panel 1 again flows through boiler 8. Also throttle valve 18 closes and the heat engine operation stops. The next time that thermostat switch C1 makes there may possibly be a higher temperature present in boiler 8 (due to return of sunny conditions). If this is so, the heat engine would start as normal but would not slow down and energize relay 110 (and the furnace operation) as just described. It should be noted that the settings of switches 59 and 60 are so arranged that relay 110 is energized only when net oil pressure drops from full speed pressure to 10 P.S.I.; but that relay 110 from full speed pressure at 10 P.S.I.; but that relay 110 will not be energized at 10 P.S.I. as the net oil pressure builds up during starting of the system. This allows the system to try to operate on solar power every time thermostat C1 cycles; but if solar heat is insufficient, operation automatically drops into furnace operation. Furnace 78 can be either gas fired or oil fired.

Second Stage Cooling (with "Furnace" supplementary)

As already described with Electric supplementary it sometimes occurs that in first stage cooling the compressor is running at less than full speed (but still deriving its heat from the solar heat at reduced temperature) and that the cooling output is insufficient. Then second stage thermostat switch C2 makes. In Furnace operation current flows from C2, through switch 77 (in the F position) and energizes relay 110, which latches, and furnace operation is initiated, and proceeds as already described. When thermostat switch C2 is satisfied it opens, but relay 110 remains latched and operation continues until thermostat switch C1 opens, as already described.

First Stage Heating (with "Electric" supplementary)

Figure 4:
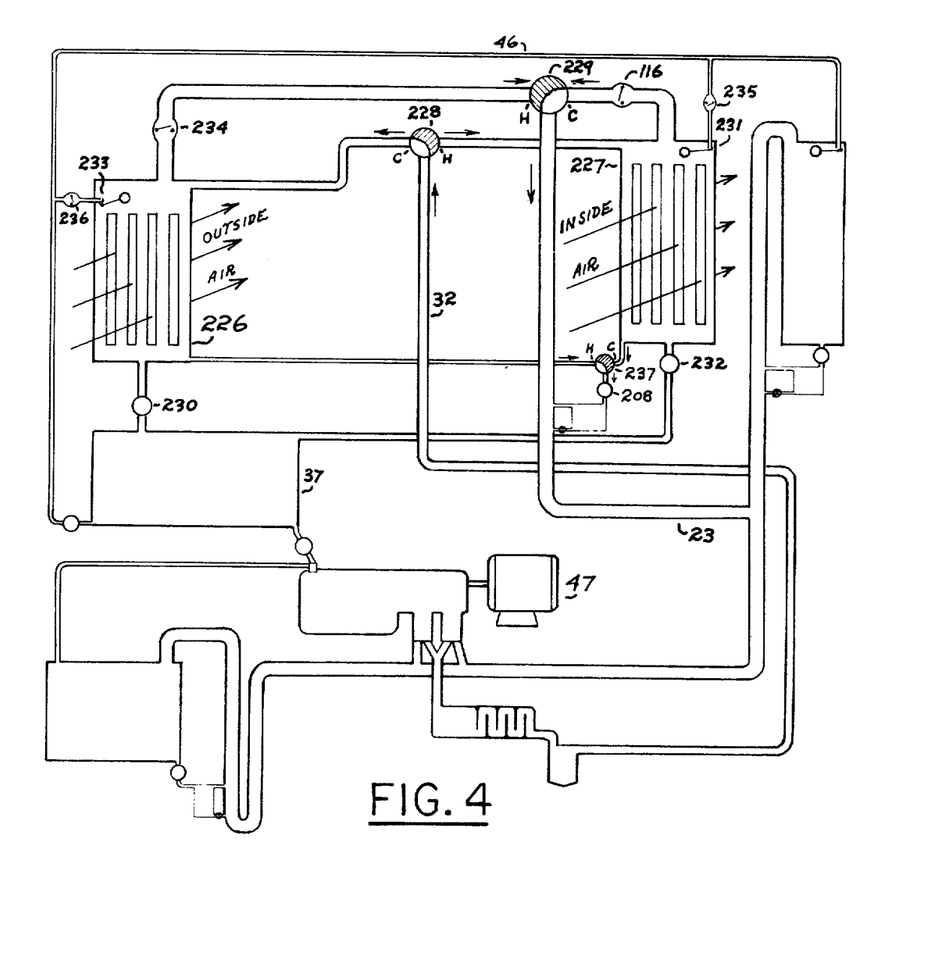
FIG. 4 shows a heat/cool changeover system utilizing refrigerant valves.

To switch from cooling to heating operation it is necessary to have outside air passing over evaporator 24 and inside air (room air) passing over condenser 33. Refer to FIG. 3. For heating operation dampers 93,94,95,96 must be moved from their respective cooling (C) positions to their heating (H) positions. Then outside air can flow from fan 97, through damper 95, through evaporator 24 through damper 96 and back to the outside through duct 99. Inside air flows from fan 100, through damper 93, through condenser 33, through damper 94 and through duct 102 to discharge inside. FIG. 4 shows an alternate arrangement for heating/cooling changeover, (using valves in the refrigerant circuit) which is described in detail later in this disclosure.

In FIG. 2, changeover switch 69 is set so that switches 70,71,72 make to the heating (H) positions and since the system is to use Electric supplementary, selector switch 73 is set with switches 74,75,76,77 in the E (Electric) positions. When first stage thermostat H1 makes, with adequate heat available in boiler 8, the system will start and run in the same manner as already described with first stage cooling (except that the air circuits through the condenser and evaporator have been changed and the system now operates as a heat pump).

When the solar generated heat in boiler 8 is insufficient to Throttle heat engine operation, the system switches automatically to electrically powered operation (as it did with first stage cooling). But since it is now in heat pump operation and since the water circulating through boiler 8 is generally warmer than outside air (due to stored heat and/or solar output at reduced level) it is advantageous to keep throttle valve 18 open so that boiler 9 operates as an additional evaporator. This operation can be described as a "solar assisted heat pump". Checkvalve 116 prevents the higher pressure vapor from boiler 8 from condensing back in evaporator 24. When the temperature of water entering boiler 8 becomes less than outside air temperature, evaporation will cease in boiler 8 and proceed in evaporator 24. throttle valve 18 is kept open in heating operation by shunting contacts 82 (in relay 83) with a connection through switch 70 (H position) and contacts 117 in time delay relay 118. Time delay relay 118 is set (typical 5 min.) so that after the system has run some time as a solar assisted heat pump and satisfied thermostat switch H1, and if substantial solar heat output has been restored, then, when thermostat switch H1 makes again, timer 118 delays the use of boiler 8 as an evaporator for 5 minutes so that the pressure can build up in boiler 8. This is necessary because when operating as a solar assisted heat pump the temperature of the water flowing through the boiler 8 from solar panel 1 drops considerably and takes some time to rise to a temperature suitable for heat engine operation even when solar heating activity has been restored. At the point when boiler pressure is restored to 7 P.S.I., switch 66 will keep the system from running continuously in electric powered operation, the system then reverts to heat engine operation as described earlier. Should the pressure not rise above 7 P.S.I. within the 5 minutes time delay relay 118 is energized, then, when contacts 117 make, the system operates again as a solar assisted heat pump. When that happens the following sequence occurs. When switch H1 makes, time delay relay 88 delays starting motor 47 for 2 minutes. Motor 47 then starts and runs continuously for 3 minutes with throttle valve 18 closed and with the compressor system drawing vapor from evaporator 24. Then time delay relay contacts 117 make and cause throttle valve 18 to open. The system continues to run as a solar assisted heat pump. Should very strong solar activity return while in solar assisted heat pump operation the pressure in boiler 8 rises to such a level to cause the condensing pressure to be excessive. Head pressure switch 81 then opens and system operation ceases. Then after head pressure switch 81 remakes (on cooling of condenser 33) the system restarts; but time delay relay 118 allows boiler pressure to build up and the system reverts to heat engine operation.

Second Stage Heating (with "Electric" supplementary)

In the manner already described with second stage cooling (Electric supplementary), when the output from the system (when running as a heat engine/compressor) is insufficient to satisfy the first stage thermostat, additional heating is called for by thermostat switch H2 which causes the system to run continuously as an electrically driven solar assisted heat pump. When thermostat switch H2 is satisfied it opens and the system is back in first stage heating operation which has already been described. As with second stage cooling, switch 65 keeps the system in heat engine operation if boiler pressure is greater than 40 P.S.I.

Third Stage Heating (with "Electric" supplementary)

With the system operating in second stage heating (Electric supplementary), with low outside temperature, and with minimal or non-existant solar activity, the heat pump output can be insufficient. Thermostat switch H3 then makes and current flows through contacts 119 in relay 120 (which are closed in normal operation), through switch 121 in bulb thermostat 122 (which is closed if the water temperature in pipe 6 is less than 50°), through switch 76 (E position), and then energizes the coil of relay 91 which makes to contact 123 thus providing power at terminal block 124. Terminal block 124 is the connection point to motor 47 for high speed operation. Motor 47 is a multi-speed motor and operates at normal speed (typical 8 pole, 875 R.P.M.) when powered through terminal block 48 and at a higher speed (typical 4 pole, 1750 R.P.M.) when powered through terminal block 124. With the higher speed drive to the heat pump compressor system a greater heat pump output is obtained. When thermostat switch H3 is satisfied it opens and the compressor motor slows to normal speed operation in second stage heating. Thermostat 122 prevents overloading of the compressor by inadvertant high speed running, with warm water in pipe 6.

First Stage Heating (with "Furnace" supplementary)

With adequate solar generated boiler heat, the heat engine, heat pump, operation is as already described (when thermostat switch H1 makes). When solar generated boiler heat is inadequate, furnace operation is automatically commenced as described in cooling operation (with Furnace supplementary), by energizing (and latching) relay 110. In addition since switch 71 is made to the H (heating) contact, valve 5 is energized while relay 110 is latched. Valve 5 is of the type which closes when energized, so that the water circulating from the solar panel 1 (which is now isolated from the boiler circuit) is caused to flow through checkvalve 10 and coil 9 in auxiliary evaporator 125. In this manner any available solar heat (or stored heat) is used to cause higher evaporation pressure (suction pressure) in auxiliary evaporator 125, thus giving better efficiency as a solar assisted heat pump (heat engine driven). Liquid refrigerant level in evaporator 125 is maintained by liquid line 46 and controlled by float valve 126. Checkvalve 116 prevents the higher pressure vapor from evaporator 125 (from condensing in the cooler evaporator 24. When the water passing through evaporator 125 becomes colder than the outside air (as at night or during dull periods) evaporation ceases in evaporator 125 and commences in evaporator 24. When thermostat switch H1 is satisfied and opens, relay 110 is de-energized, throttle valve 18 is de-energized and operation stops.

Second Stage Heating (with "Furnace" supplementary)

When thermostat switch H2 makes, due to insufficient heat output in first stage heating operation, furnace operation is initiated by energizing relay 110 directly, (through switch 77 in the F position). This function of thermostat switch H2 is the same as the function of thermostat switch C2 in second stage cooling (Furnace supplementary). When furnace operation is initiated, valve 5 is closed, and auxiliary evaporator 125 is used as in first stage heating (Furnace supplementary) as already described. When room temperature rises, thermostat switch H2 is satisfied and opens but relay 110 remains latched and system operation continues until thermostat switch H1 is satisfied. Then relay 110 is de-energized, throttle valve 18 is de-energized and the system stops. Termination of furnace operation in heating operation is similar to termination in cooling which has already been described.

Liquid refrigerant level control

Refer to FIG. 1. The primary distribution center of liquid refrigerant is receiver 37, since all refrigerant travelling in the system ultimately condenses in condenser 33 and drains into receiver 37, to be distributed from it, back to various parts of the system. Liquid line 46 connects (through the normally open liquid line solenoid valve 127) to the lowest point in receiver 37, and supplies liquid to evaporators 24 and 125. The liquid levels in these evaporators are controlled by float valves 45 and 126 and so while any liquid is available in receiver 37 the evaporators will be kept at operating level. Stand-pipe 128 is set to drain liquid at a higher level in receiver 37 so that any liquid available in the receiver additional to the requirements of the evaporators drains through stand-pipe 128, through the normally open liquid line solenoid valve 38 and is pumped by injector pump 39 into boiler 8. The refrigerant charge in the system is of such quantity that with evaporators 24 and 125 filled to operating level (with liquid refrigerant) and with the liquid level in receiver 37 up to stand-pipe 128 the remaining liquid will be pumped (by pump 39) into boiler 8; and this remainder will comprise a suitable operating charge for boiler 8. Pump 39 must of course have a pumping capacity greater than the maximum feed requirements of boiler 8.

Solar panel bypass control

With good sunny conditions the water discharged from pump 2 (FIG. 2) is pumped through solar panel 1, through checkvalve 3 and into pipe 129. Water temperature as sensed by bulb 130 in solar panel 1 (near the discharge) is greater then the temperature at the discharge of pump 2 as sensed by bulb 131. Then pressure in bellows 132 is greater than in bellows 133, so pivot bar 134 moves against the pressure of spring 135 to keep switch 136 open. So stop valve 11 remains de-energized and is normally closed, thus forcing flow through panel 1. Should there be no solar activity the temperatures at bulbs 130 and 131 would be the same, and the pressures in bellows 132 and 133 would be equal. Then spring 135 is able to move pivot bar 134 to close switch 136. Current then flows to energize stop valve 11 which opens. Checkvalve 3 is set to close when flow is thus diverted through stop valve 11. A typical operation of checkvalve 3 would be to open when pressure across it is 1 P.S.I. With stop valve 11 open the pressure drop across checkvalve 3 is negligible. Should solar activity return, bulb 130 in the solar panel will become warmer than bulb 131 and switch 136 will be opened and stop valve closed, forcing flow through panel 1 again.

This prevents loss of heat from the circulating water which would occur if it flowed through panel 1 during night (and cloudy) periods.

Storage tank control

The basic idea of heat storage is to employ tank 13 (FIG. 2) (which has typical capacity of a thousand gallon or more) to absorb heat, at times when surplus solar generated heat is available, so that this heat can be retrieved at times when solar output is insufficient. Differential controller 137 (FIG. 2) has sensing bulb 138 detecting water temperature in pipe 129, and sensing bulb 139 detecting temperature in tank 13 (near water outlet). When the temperature in pipe 129 is greater than in tank 13 switch 140 is made to contact 141. When the temperature in pipe 129 is less than in tank 13 switch 140 is made to contact 142. Any time the system is running the coil of relay 143 is energized (through thermostat switches C1 or H1) and switch 144 is made to contact 145. So, with the system running and with the water in pipe 129 warmer than in tank 13, current flows from L1 through contact 141 of switch 140, through contact 145 of switch 144, to energize stop valve 4 (which then is open). Water then flows directly through valve 4 and into pipe 146, and there is no flow through tank 13 since checkvalve 12 is lightly springloaded and prevents flow. However should the temperature of water in pipe 129 drop lower than the temperature in tank 13, switch 140 breaks from contact 141 and valve 4 is de-energized (and closes). Flow is then forced through tank 13 (and checkvalve 12) and thus the warmer water in tank 13 is introduced into the water circuit. In this manner the warmest water available (either from the tank or the solar panel) is delivered to pipe 146 at the times the system is running.

When the system stops, relay 143 is de-energized and switch 144 makes to contact 146 and then (if water in pipe 129 is warmer than in tank 13) there will be no current flow through switch 144, valve 4 will be closed and the warm water will flow into tank 13 and storage will thus be achieved in the off cycle. If the water from pipe 129 is cooler than tank 13 (with the system off) current flows from L1 through contact 142 of switch 140, through contact 146 or switch 144 to energize valve 4 and thus tank 13 is bypassed.

Much of the time when the system is running there is an overabundance of solar output which results in the water temperature in pipe 129 being higher than needed for system operation. Bulb 147 senses the temperature of water in pipe 146 and as temperature rises at 147, bellows 148 pushes downward on valve gate 149 which throttles the flow of water through valve 150. This throttling effect causes some of the hot water flowing from pipe 129 to be diverted into tank 13 while the water displaced from tank (which tends to be cooler) flows through checkvalve 12 into pipe 146 where it mixes with the reduced flow of hot water coming from valve 150. The temperature of the mixed water in pipe 146 is thus less than the temperature of the hot water in pipe 129 but is still adequate for system operation. The excess heat of course is thus accumulated in tank 13. The movement of gate 149 proceeds through a range of positions from fully open to nearly closed and for a given temperature at bulb 147, gate 149 will maintain a certain position. A typical performance of valve 150 is to remain fully open with temperatures (at bulb 147) up to 150° and to commence throttling as temperature rises above this point. Valve 150 as shown is wholly mechanical and functions in the commonly used arrangement in which bulb 147 is partially filled with a volatile liquid such as Freon 12 and this liquid then maintains saturated vapor at a pressure relative to the temperature of the bulb. This pressure is transmitted by pressure line 151 to bellows 148 which presses to oppose control spring 152 and which operates gate 149 directly. Alternately any type of electrically or mechanically operated temperature sensitive, throttling valve could be used in place of valve 150.

ENGINE/COMPRESSOR DETAILS (Heat Engine operation)

Figure 5:
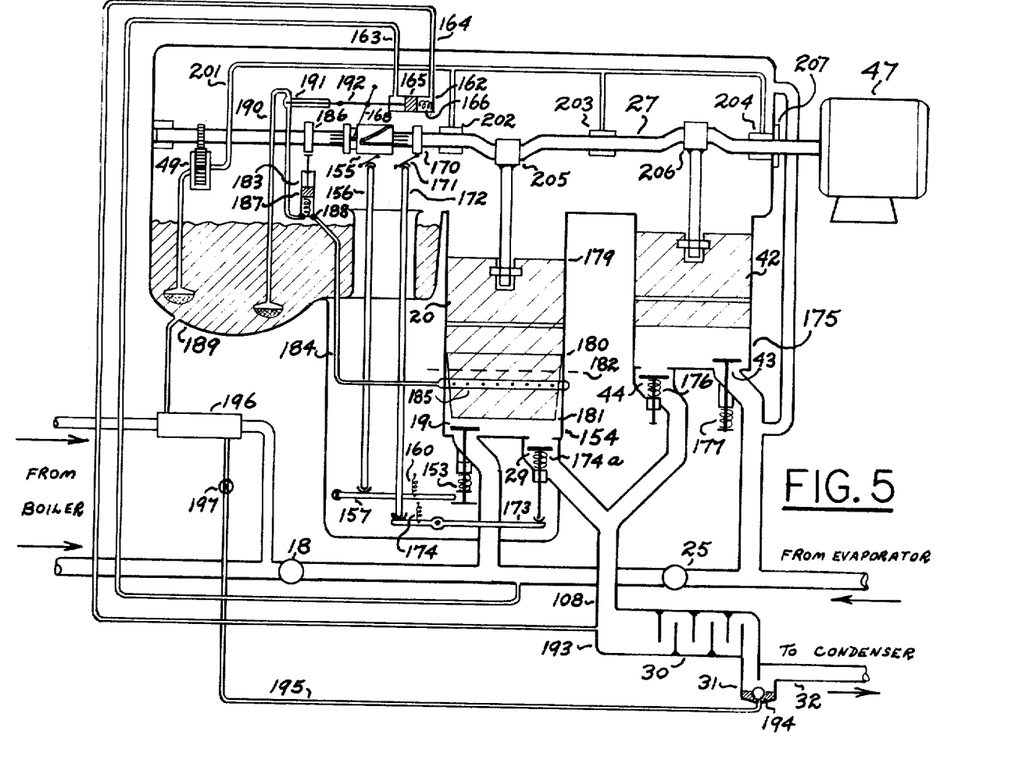
FIG. 5 shows mechanical details of the engine/compressor unit.
Figure 6:
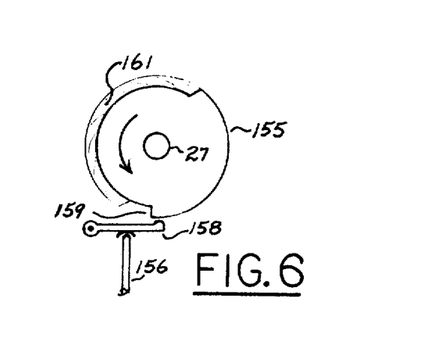
FIG. 6 is a detail view of the inlet cam.

Refer to FIG. 5. With the system running under heat engine power, stop valve 25 is closed and throttle valve 18 is open so that boiler pressure is present at inlet valve 19. During the upward (power) stroke of piston 20, high pressure vapor from the boiler forces valve 19 to open against pressure from valve spring 153 thus allowing this high pressure vapor into cylinder 154, so that pressure is applied to piston 20. However during the downward (exhaust) stroke of piston 20 inlet valve 19 must be kept closed, so cam 155 causes downward pressure on push-rod 156 which presses on lever 157 which pulls on the end of valve 19 and pulls it closed. FIG. 6 shows cam 155 rotating with crankshaft 27. Cam follower 158 makes contact with cam 155 and transfers pressure to push rod 156. It can be seen that when the heel 159 of cam 155 passes, follower 158 is allowed to rise upward and push-rod 156 can rise with it. Referring back to FIG. 5, the bottom of push rod 156 contacts lever 157 which is pulled upward by spring 160 and by valve 19 and this upward pressure is transmitted (via push rod 156) causing follower 158 (FIG. 6) to rise after heel 159 has passed. Upward movement of lever 157 (FIG. 5) allows free movement of valve 19, which opens under pressure from the boiler. In effect, when heel 159 of cam 155 passes follower 158 (FIG. 6) valve 19 is allowed to open, and the setting of cam 155 is such that this occurs at bottom dead center of piston 20, at which point the power stroke commences. Then after crankshaft 27 (FIG. 6) has made less than one half turn, the slope 161, of cam 155 engages follower 158 forcing it to push downwards on push-rod 156 and lever 157 (FIG. 5) which pulls valve 19 closed. This occurs before top dead center of piston 20. The exact point at which valve 19 closes is generally called the inlet cut-off point, and for best efficiency of engine operation the timing of cut-off should vary according to the pressure difference between boiler and condenser. That is, with high boiler pressure (relative to condensing pressure) the inlet valve 19 should close much sooner than with low boiler pressure. This allows expansion (and pressure reduction) to take place during the power stroke so that there will be no loss of energy due to discharge of high pressure vapor in the exhaust stroke. This is well known in heat engine (reciprocating steam engine) technology. To achieve an automatically controlled variation of inlet valve cut-off, control cylinder 162 is connected (see FIG. 5) by control lines 163, 164 so that the pressure exerted on piston 165 (which tends to compress control spring 166) is a function of the excess of the pressure delivered at valve 19, over the pressure in discharge pipe (exhaust line) 108. This excess is the difference between boiler and condenser pressures (while throttle valve 18 is open). Piston 165 thus remains in a position in cylinder 162 that is relative to boiler/condenser pressure. Rod 167 (FIG. 7) connects piston 165 to positioning lever 168, which engages in groove 169 of cam 155, which slides on crankshaft 27, so that when piston 165 moves to a position in cylinder 162 (relative to boiler/condenser pressure) cam 155 is caused to slide axially on crankshaft 27 to a matching position. Crankshaft 27 has splines in which a splined bore of cam 155 engages. Cam follower 158 engages with cam 155 during rotation as already described. Heel 159 of cam 155 is cut parallel to the axis of crankshaft 27 so that regardless of the position cam 155 slides on crankshaft 27, the opening point of inlet valve 19 will be the same; (bottom dead center). But the slope 161 is cut on cam 155 in a helical form so that a varying spacing between heel 159 and slope 161 is encountered by follower 158 (during rotation of cam 155) in the various positions of cam 155 on crankshaft 27. With a high relative boiler pressure, cam 155 is located in crankshaft 27 in such a position that (as rotation occurs), downward actuation of follower 158 by slope 161 (and thus inlet shut-off) occurs relatively soon after opening of the inlet valve (controlled by heel 159). Conversely lower relative boiler pressure causes cam 155 to move to a position where the spacing between the heel 159 and slope 161 is greater, and a later inlet shut off is achieved.

Figure 7:
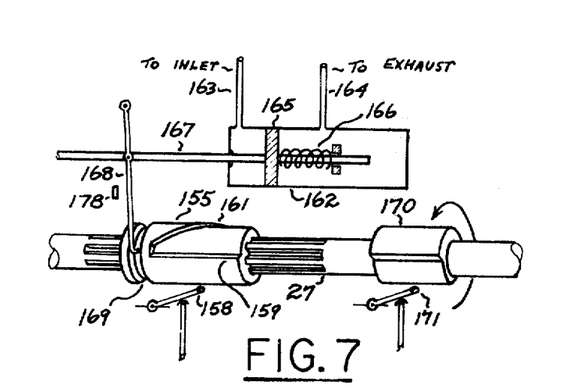
FIG. 7 is a detail view of the cam control mechanism.

Exhaust valve 29 (FIG. 5) must be allowed to open during downward (exhaust) strokes of piston 20, but must be kept closed during upward (power) strokes. Cam 170 presses downward on follower 171 and push rod 172 (during power strokes) causing rocker 173 to hold valve 29 closed. During exhaust strokes cam 170 takes pressure off follower 171 and push-rod 172, allowing spring 174 to pull on rocker 173 so that pressure is removed from valve 29. Valve spring 174a is lightly loaded and tends to hold valve 29 closed, but during the exhaust strokes valve 29 is forced open by vapor pressure from piston 20. FIG. 7 shows an enlarged view of cam 170 rotating with shaft 27 to engage cam follower 171. Valves 43 and 44 of the compressor cylinder 175 are poppet valves of the conventional pressure actuated type generally used in refrigeration compressors. Valve springs 176, 177 tend to hold the valves on their seats in the conventional manner. Reed type or disc type valves could be used as alternatives to the poppet valves shown.

COMPRESSOR DETAILS (Electric heat pump operation)

When the system operates as an electrically powered heat pump driven by motor 47 (as already described), cylinder 154 functions as an additional compressor cylinder. The pressure of the vapor then flowing to inlet valve 19 is generally lower than the pressure of the vapor discharged at discharge (exhaust) valve 29 since the vapor at valve 19 originates in the evaporators 24, 125 (FIG. 1) or in the boiler 8 which is then operating as an additional evaporator (at reduced temperature). This reduced pressure at the inlet valve is transmitted by control line 163 (FIG. 5) to cylinder 162 and control spring 166 pushes piston 165 to move away from it. FIG. 7 shows how movement of piston 165 (under pressure from spring 166) causes cam 155 to move so that a longer space between heel 159 and slope 161 (of cam 155) is encountered by follower 158. In effect, when the inlet pressure is less than discharge pressure, piston 165 causes cam 155 to function to close inlet valve 19 after the maximum delay. A typical arrangement of cam 155 is that during times when inlet (boiler) pressure is greater than exhaust (discharge) pressure, inlet valve cut-off is effected before top dead center, while at lower inlet pressures, cut-off is delayed further, until the point is reached at which inlet pressure and exhaust pressure are the same; then cut-off comes at top dead center. At this point of course the system would be electrically driven with cylinder 154 (FIG. 5) functioning as a compressor. When inlet pressure drops below exhaust (discharge) pressure, piston 165 (FIG. 7) moves (forced by discharge pressure) until positioning lever 168 contacts stop 178. At the point when inlet and exhaust pressures are the same, spring 166 is fully expanded. So, when inlet pressure drops below exhaust pressure, piston 165 moves away from spring 166 and is not influenced by it. When lever 168 contacts stop 178 it positions cam 155 in the position of maximum delay and in this position cam 155 functions as if to close inlet valve 19 at a point well after top dead center. A typical point would be 30 degrees after top dead center. This point is not critical since valve 19 (FIG. 5) can (and does) close earlier (by pressure from spring 153) and the reason for allowing the 30 degree lag is to prevent slope 161 of cam 155 from closing valve 19 prematurely. The reason that valve 19 is allowed to close after top dead center (in compressor operation) is that at the end of the inlet (suction) stroke of a compressor the pressure in the cylinder has not quite reached suction pressure so that the inlet valve stays open a little after top dead center until the cylinder pressure and suction pressure equalize at which time valve spring 153 pulls valve 19 closed.

When cylinder 154 (FIG. 5) is being used as a compressor, cam 155 does not control the actuation of valve 19. Valve 19 is pressure actuated then, in the same manner as valve 44. Cam 155 brings pressure to close valve 19 only after it has already closed. And valve 19 opens (under vapor pressure) a little after bottom dead center so that cam 155 does not influence its opening.

Similarly (in compressor function of cylinder 154) valve 29 is not directly controlled (to open) by cam valve 29. At top dead center of piston 20, cam 170 releases 170. valve 29 to open but it does not open until the vapor in cylinder 154 is compressed to discharge pressure. Closing of valve 29 occurs at bottom dead center in all operation.

Other types of valve control and actuation can be used to achieve heat enging and compressor function and what has been described is one workable method.

WET CYLINDER OPERATION

Figure 8:
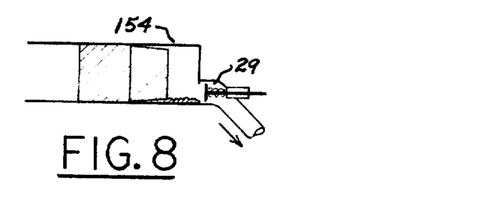
FIG. 8 shows an alternate arrangement with the heat engine cylinder horizontal.

In heat engine applications it is common practise to use superheated vapor for expansion in the cylinder for reasons of efficiency, and because when saturated vapor is used, much liquid condenses in the cylinder during expansion causing lubrication problems. Superheating is plainly advantageous, if a source of heat at temperature levels above boiling temperature is available. With the system employing Furnace supplementary heat, flue gases can be used to heat a superheat coil. Such an arrangement is not described in detail since it is a well known practise. However when in purely solar powered operation there is usually no high temperature source of heat for superheating purposes. So, the engine is constructed to be able to cope with the substantial quantity of liquid that condenses within the cylinder during the expansion of saturated vapor. The cylinder 154 (FIG. 5) is inverted so that any liquid condensed within, drains downward (away from the piston 20 and the lubricated cylinder walls) and out through the exhaust valve 29 during the exhaust stroke. Cylinder 154 is shown with its axis vertical but other arrangements could be used where the exis might be tilted, or horizontal (as shown in FIG. 8) with exhaust valve 29 placed at a low point so that any liquid on the walls of cylinder 154 can drain out through the exhaust valve. The outer surface of piston 20 (FIG. 5) from the top edge 179 to mid-section 180 is cylindrical and sized relative to the bore of cylinder 154 with normal working clearance. The lower surface, from mid-section 180 to bottom edge 181, comprises an extension which is relieved by a slight taper so that as piston 20 moves in cylinder 154, its upper section provides bearing surface contacting the cylinder walls while the lower section (from mid-section 180 to bottom edge 181) does not contact the cylinder walls. Typical taper of the lower section might be 1°. This lower section provides a shield to prevent liquid refrigerant from coming in contact with the upper cylinder walls (which comprise bearing surfaces) and thus washing the lubricating oil from them. FIG. 5 shows piston 20 a little above bottom dead center. Section line 182 marks the position of piston midsection 180 at bottom dead center. The cylinder walls above section line 182 comprise bearing surfaces with piston 20 and the cylinder walls below section line 182 are not bearing surfaces. It can be seen that if the lower section of piston 20 (i.e. the distance from 180 to 181) is longer than its working stroke, then the bottom edge 181 will still be below section line 182 at top dead center. The lower section of piston 20 thus covers the upper bearing surfaces of the cylinder at all parts of the stroke and helps prevent condensed liquid coming an contact with them. Some dilution of cylinder lubricant still occurs but it is reduced to an allowable level.

To improve cylinder lubrication further, oil injection pump 183 can be used to inject oil between the lower (tapered) section of piston 20 and the lower cylinder walls. Pump 183 is actuated by cam 186 on crankshaft 27 so that piston 187 makes one discharge stroke (through valve 188) for every revolution of crankshaft 27. Cam 186 is timed so that this injection of oil occurs during all or most of the upward (power) stroke of piston 20. Pump 183 can be sized so that the quantity of oil injected per stroke need not be greater than is required to fill the space between the tapered section of piston 20 and the lower cylinder walls. Ideal lubrication can be achieved with considerably less oil than this, since much oil will remain lodged between the (lower) piston and the cylinder wall during the exhaust stroke of piston 20, leaving less space to fill on the next injection. This injection of oil during power strokes tends to keep a barrier of oil around the tapered section of piston 20, which displaces and blocks any liquid refrigerant which otherwise might find its way to the upper cylinder walls, causing lubrication problems. Pump 183 draws oil from sump 189 through intake pipe 190 and this oil flows through valve 191 which is actuated by linkage 192 from positioning lever 168 so that when cylinder 154 is functioning as a compressor, and positioning lever is then positioned away from cylinder 162 (as already described), valve 191 is closed and oil injection is discontinued. Pump 183 could alternately be driven off crankshaft 27 by an eccentric or crank arrangement, and other types of pump could be used. The injected oil ultimately drains down the cylinder walls and is discharged through exhaust valve 29, mixed with expanded vapor and condensed liquid refrigerant. Discharge vapor from compressor cylinder 175 flows through discharge valve 44 (as already described) and through common discharge pipe 108 to mixing chamber 193. Thus the pressures of the vapors discharged through valve 29 and through valve 44 are the same. But while the vapor through valve 29 (during heat engine operation) is saturated (and thus at the boiling temperature consistent with its pressure) the vapor through valve 44 is superheated (by the work of compression) and thus at a higher temperature. These vapors mix in pipe 108 and mixing chamber 193 and the resulting mixture is a superheated vapor. Also travelling from valve 29 (as already described) is a quantity of liquid refrigerant and oil which drains to the bottom of the mixing chamber 193. The superheated vapor flows through mixing coil 30 and the oil/liquid refrigerant mixture is carried through with it by vapor velocity. During the flow through coil 30, heat from the vapor is transferred to the refrigerant liquid which boils, leaving only the oil in liquid form. Mixing coil 30 discharges into oil separator 31 and discharge vapor flows from it, through discharge pipe 32 to the condenser. Oil accumulating in separator 31 actuates float valve 194 which opens periodically to allow oil to flow through pipe 195, through heat exchanger 196 and back to the oil sump 189. In most phases of heat engine operation the superheat generated in compressor cylinder 175 is sufficient to vaporize any liquid refrigerant in the manner described but under some conditions, the superheat can be insufficient and some liquid refrigerant will then be mixed with the oil in separator 31. Oil flowing in pipe 195 passes through restrictor 197, and since oil coming from separator 31 is at discharge (condensor) pressure and since sump 189 is at suction pressure, a pressure drop will occur at restrictor 197. Then any liquid refrigerant mixed with the oil will boil out at the lower pressure (after restrictor 197). This causes strong cooling action of the oil, which is then reheated as it passes through heat exchanger 196. In heat exchanger 196 (see FIG. 1) a quantity of the hot vapor from boiler 8 is passed over coil 198 and then returned by pipe 199 into boiler pipe 17, thus heating the oil (and possibly refrigerant) which flows through coil 198 and then returns to sump 189. This action helps keep the oil in sump 189 at a temperature above the boiling point of refrigerant (at the pressure existant in the sump), and thus prevents any possible accumulation of liquid refrigerant. Throttle valve 200 is manually adjustable and can be adjusted to a setting to trim the vapor flow through heat exchanger 196 so that effective (but not excessive) heating of the return oil is achieved in various phases of the systems operation. The heating effect of heat exchanger 196 on the oil returning to sump 189 tends to be self regulatory in a number of ways: When there is liquid mixed with the oil in pipe 195, cooling after restrictor 197 occurs, and, with greater temperature difference, more heat is transferred than would be transferred if there were no liquid mixed with the oil. Also, the higher the temperature in boiler 8, the greater the incidence of condensate within cylinder 154; but co-respondingly, the temperature of heat exchanger 196 is then higher which tends to compensate for this. When cylinder 154 is operating as a compressor no condensation occurs and indeed heat exchanger 196 acts as an oil cooler since any vapor coming from boiler 8 is cooler than discharge temperature; but at this time the overall cooling effect of the oil in sump 189 is not significant since oil injection is not in operation and the quantity of oil flowing in pipe 195 is minimal.

Oil pump 49 (FIG. 5) is of the positive displacement type (gear, eccentric, piston etc.) and delivers oil through pipe 201 to bearings 202, 203, 204, and to all other bearing surfaces requiring lubrication. Oil passages are drilled in crankshaft 27 so that crank bearings 205, 206 are force fed in a conventional manner. Oil moves through each of the bearings to escape into the lower pressure of the crankcase enclosure and since the bearing clearances remain substantially constant, this lubrication system constitutes a hydraulic circuit comprised of a positive displacement pump delivering oil to a plurality of fixed orifices. It is then clear that if the rotation speed of pump 49 is varied there will be a co-responding variation in pump discharge pressure (providing the orifices remain constant). The use of this variable pressure as a control factor has already been described. Oil escaping from the various bearings falls (and is thrown) to lubricate pistons and cylinder walls. At top dead center the pistons displace any oil lying on them and this oil runs back to sump 189. Compressor cylinder 175 has been shown in the same inverted position as cylinder 154 for convenience, but alternately it could be mounted in any other position since the reasons for inverting cylinder 154 do not apply to the compressor cylinder 175. Also the compressor need not necessarily be of the reciprocating piston type as shown with cylinder 175 and piston 42, but alternately can be a rotary compressor or any other type of positive displacement compressor.

Motor 47 drives crankshaft (FIG. 5) and shaft seal 207 prevents loss of crankcase pressure, in the manner of a conventional open compressor drive. Alternately motor 47 can be included in the crankcase enclosure in the conventional hermetic arrangement with the vapor that flows toward inlet valve 43 being diverted through the motor windings (as a cooling medium).

The configuration described has shown one cylinder being used as an engine (convertible to compressor function) and one cylinder being used as a compressor; but alternate configurations might use multiple cylinders in one or both of these arrangements.

Oil separators are generally not totally effective in the sense that some oil in the form of a fog is carried through with the discharge vapor and deposited in the condenser to form a diluted mixture with the liquid refrigerant. In the system disclosed flooded evaporators and a boiler are fed this diluted mixture, and the tendency exists for any oil to remain trapped in these components as refrigerant vapor boils off. This oil thus accumulates, and the oil in sump 189 is depleted. Corrective oil recovery must then be performed. The time taken for oil depletion to occur depends on many things and can be quite a long period such as several days or much longer. The prime factor is of course the efficiency of the oil separator itself and generally the larger and more complex separator is the most effective. Also it is quite possible that a separator could be constructed which would preclude the necessity for oil recovery. However a number of oil recovery methods have been used in the past and a novel workable recovery system is now described. See FIG. 1. When oil has accumulated in boiler 8, evaporator 24, and evaporator 125, a drop in the oil level in sump 189 occurs. The boiler and evaporators must then be pumped down and the trapped oil drained into the pipes that deliver vapor to the engine and compressor. Vapor velocity then carries this reclaimed oil to the engine and compressor cylinders and it is passed on (with the discharge vapor) to the oil separator, and then returned to the oil sump. To pump down evaporators 24 and 125 and boiler 8, liquid line solenoid valves 38, 127 are closed and motor 47 is then kept running for a predetermined time. The liquid refrigerant in the evaporators and the boiler is thus boiled off while the trapped oil remains. The closed liquid line solenoid valves 38, 127 prevent any additional liquid from entering the evaporators and boiler. Oil drain solenoid valves 208, 209, 210 are then opened for a predetermined time and the oil remaining in evaporators 24, 125 and boiler 8 then drains into oil receivers 211, 212, 213. Equalizer pipes 211a. 212a. 213a allow the receivers to fill by venting out trapped vapor. Drain solenoids 208, 209, 210 are then closed, liquid line solenoid valves 38, 127 are opened and the system goes back to normal operation. The oil held in receivers 211, 212, 213 then drains slowly through restrictors 214, 215, 216 into suction line 23 and boiler pipe 17 and is returned by vapor velocity to the engine/compressor. This oil is mainly in liquid form, that is it travels as a trickle of liquid (rather than a fog) and can be relatively easily separated from the vapor by a gravity separator such as separator 31. In the arrangement shown the recovered oil passes through the heat engine cylinder and the compressor cylinder before being separated by separator 31. The method of oil recovery by pumping down an evaporator or a boiler and then draining the recovered oil into a pipe leading away from the evaporator or boiler can be used on any flooded evaporator refrigeration system or any heat engine system using a boiler and refrigerant recirculated from a condenser. The oil separator need not necessarily be placed after the engine/compressor as shown but can be placed anywhere in the system where vapor and liquid oil are moving together and thus can be separated easily. Means must also be provided to convey the separated oil to the sump. In the oil recovery arrangement described motor 47 is kept running and throttle valve 18 is kept open for a predetermined time (after draining the evaporators and boiler) to allow the oil to be carried back through the engine/compressor gradually.

Automatic electrical control of the oil recovery cycle is shown in FIG. 2. When the oil level in sump 189 drops below a predetermined level, float switch 217 makes and current flows from L1, through the normally closed contacts of time delay relay 218, to energize the coil of time delay relay 219. A typical setting of relay 219 is 4 minutes, and after this time has elapsed the contacts of relay 219 make and the oil recovery cycle is initiated. Current then flows through the contacts of relay 219 to energize the coils of time delay relays 218,220 and relay 120. The contacts 221 of relay 120 then make, and current flows to energize liquid line solenoids 127 and 38 which then close. These solenoids are of the type which open when de-energized. Also when relay 120 is energized, contacts 222 switch current to energize the coil of time delay relay 223, and contacts 224, 225 are made instantly. Contacts 224 send current to energize motor 47 (through relay 90) and contacts 225 send current to energize throttle valve 18 (through switch 61). Thus (at the initiation of oil recovery) the motor is kept running, liquid lines solenoid valves closed, the throttle valve opened and the coils of time delay relays 218,220 are energized. Pump down proceeds and at a predetermined time (sufficient to evaporate the liquid refrigerant from evaporators 24, 125 and boiler 8) the contacts of timer 220 close and current flows to energize (and open) oil drain solenoid valves 208,209,210. Typical setting of time delay relay 220 is 5 minutes. A typical setting of time delay relay 218 is 6 minutes, so that about 1 minute after relay 220 makes (to open the oil drain solenoid valves), the normally closed contacts of time delay relay 218 are opened and oil recovery is terminated; 1 minute being sufficient time for the reclaimed oil to drain into the oil receivers. At termination, the liquid line solenoid valves are re-opened, and the oil drain solenoid valves closed. The coil of time delay relay 223 is de-energized, but this relay is the type which provides a time spacer after de-energizing and the contacts thus remain closed for a period of time, so that motor 47 is kept running (with throttle valve 18 open) and provides vapor velocity to return oil to the engine/compressor. A typical setting of time delay relay 223 is 3 minutes. At the moment of termination of oil recovery no oil would yet be returned back to sump 189 and so float switch 217 would still be made (and thus calling for another oil recovery cycle). But time delay relay 219 (set 4 minutes) holds off initiation of oil recovery while the oil is being returned to the sump. Then float valve 217 opens and no longer calls for oil recovery. While oil recovery is in progress contacts 119 in relay 120 are kept open to prevent high speed operation of motor 47.

HEAT/COOL CHANGEOVER

As already described (and shown in FIG. 3) when the system is changed between cooling and heating operation, the flow of air from outside the building, and the flow (circulation) of air inside the building is changed between the condenser and the evaporator coils by dampers. An alternate method of changing between heating and cooling shown in FIG. 4 involves the use of changeover valves in the refrigerant circuit so that outside air always passes through the outside coil 226 and inside air through the inside coil 227, and the function of each of those coils is changed between condenser and evaporator by changes in refrigerant flow (controlled by changeover valves 228 and 229, which are two position, three way valves).

In cooling operation discharge vapor from discharge pipe 32 flows through the C port of valve 228 and to the outside coil 226 which is functioning as a condenser. The H port of valve 228 is closed. Liquid condenses in coil 226 and drains through valve 230 (open in cooling) into receiver 37. Inside coil 227 functions as an evaporator in cooling operation and is fed liquid by float valve 231 from liquid line 46 in the manner described earlier. Valve 232 is kept closed in cooling. Evaporated vapor from the inside coil 227 flows through checkvalve 116, through the C port of valve 229 and to suction line 23. The H port of valve 229 is closed. The function of the boiler, the engine/compressor and other components is as already described. It can be seen that the system thus operates (in cooling function) in the manner described earlier in this disclosure (FIG. 1) but with outside coil 226 (FIG. 4) acting in the manner of condenser 33 (in FIG. 1) and with inside coil 227 (FIG. 4) operating in the manner of evaporator coil 24 (in FIG. 1).

To change from cooling to heating, changeover valves 228,229 are switched so that the C ports are closed and the H ports open. Also valve 230 is closed and valve 232 opened. Discharge vapor then flows to the inside coil 227 where it condenses and drains through valve 232 to receiver 37. Outside coil 226 now operates as an evaporator and is fed liquid refrigerant through float valve 233. Vapor flows through checkvalve 234, through the H port of valve 229 to suction line 23. The functions of other components is unchanged. Checkvalve 235 is used to prevent high pressure vapor in inside coil 227 from flowing back through liquid line 46 (and float valve 223) into outside coil 226 (which is now at suction pressure). Checkvalve 236 prevents a similar flow back from outside coil 226 to inside coil 227 (during cooling operation). When the oil recovery cycle is being performed, oil drain solenoid valve 208 is still used to control the draining of the evaporator, but whereas in the earlier described arrangement, evaporator 24 (FIG. 1) was being drained, in this arrangement (FIG. 4) two position three-way valve 237 selects between drain lines from outside coil 226 and inside coil 227. The valves used for changeover (valves 228,229,230,232,237) can be actuated manually or electrically. Similarly the changeover dampers shown in FIG. 3 can be manually or electrically actuated.

In heat pump operation the outside evaporator coil tends to collect frost in winter operation. This is a well known problem and methods of detecting the frost accumulation are widely known. The most common method of removal of frost is to temporarily reverse the functions of the evaporator to condenser function providing heat to melt the frost. Electrically actuated changeover valves are then used. Defrost cycle by controlling electrically operated changeover valves is commonplace and need not be explained in detail.

All preceeding descriptions involving condenser and evaporator coils describe air as the medium contacting these coils (which are essentially heat pump components). However these coils can be used when contacted by water, in configurations commonly used with heat pumps. That is the outside coil (FIG. 4) can be contacted with water from a lake or stream and better efficiency of the heat pump operation achieved. The term "heat sink" can be used to describe the outside body of water (or air) into which heat is rejected in cooling function and from which heat is drawn in heat pump function. Also the inside coil (FIG. 4) can be contacted by water and a hydronic circulation used. Another alternative configuration is to use the refrigerant circuits shown in FIG. 1, but to use water contacting condenser 33 and evaporator 24 (instead of outside air and inside air as described). The outside water can be from a stream (or a water tower) and the inside water can be a hydronic circulation using fan coils to cool the air. To switch between heating and cooling operation changeover water valves can be used in the same manner as the changeover dampers shown in FIG. 3. The only difference being that water is the medium being controlled instead of air. All these arrangements comprise the commonly known "air to air", "air to water", "water to air", and "water to water" heat pump configurations and changeover means associated with them are well known.

As described, the system has capability to utilize supplementary energy input from either electrical power or a furnace (gas or oil). It is quite obvious that a simplified version of the system can be made without the furnace capacity. The furnace 78, (FIG. 2) pump 113, check valves 7, 14, stopvalve 16, auxiliary evaporator 125, stopvalve 5, checkvalve 10, and all the electrical controls associated with these components, would then not be used. Placing the selector switch 73 in the "electric" position, of course, effectively removes all the furnace equipment from operation but alternately the system could be constructed without the furnace equipment.

Safety controls such as an oil failure switch, motor overloads and other commonly known safeties should be used with this system but have not been shown for simplicity and since their use is well known.

We claim:

1. In combination, means of circulating a primary flow of circulating liquid, and means of heating the said primary flow of circulating liquid by solar radiation to a sensible temperature greater than the sensible temperature of the outside heat sink, and a boiler means of causing liquid refrigerant to boil to a vapor, and means of controlling the said primary flow of circulating liquid to heat the said boiler means, and means of introducing the said vapor into a cylinder, and the said means of introducing including an inlet valve, and a piston which is moved in the said cylinder by pressure from the said vapor when the said pressure is adequate to cause this movement, and means of connecting the said piston to a crankshaft so that the movement of the said piston under the influence of the said pressure causes rotation of the said crankshaft in the function of a heat engine, and means of exhausting the said vapor from the said cylinder to a condenser cooled by the outside heat sink, and means of injecting liquid refrigerant from the said condenser into the said boiler, and an evaporator in which refrigerant liquid evaporates at a sensible temperature lower than the sensible temperature of the outside heat sink, and means of introducing liquid refrigerant into the said evaporator from the said condenser, and means of coupling the said crankshaft to drive a positive displacement compressor means of drawing refrigerant vapor from the said evaporator, and means of discharging the vapor compressed by the said positive displacement compressor means into the said condenser, and means of circulating a fluid medium to contact the said evaporator so that the said fluid medium receives a cooling effect from the said evaporator, and means of circulating the said fluid medium to cool the inside of a building, and an electric motor means of driving the said crankshaft, and means of automatically controlling the said electric motor means to provide motive power to start the motion of the said function of a heat engine, and means of automatically controlling the said electric motor means to provide motive power to drive the said positive displacement compressor means when the said cooling effect is required to cause cooling of the said inside of a building during times when the sensible temperature in the said boiler means is too low for the said function of a heat engine to provide sufficient power to drive the said compressor means fast enough to provide the said cooling effect in sufficient quantity to keep the said inside of a building cooled to a pre-determined sensible temperature, and valve means of shutting off flow of vapor from the said boiler means to the said cylinder during the said times when the sensible temperature in the said boiler means is too low, and valve means of conducting vapor flow from the said evaporator through the said inlet valve into the said cylinder during the said times when the sensible temperature in the said boiler means is too low, so that the said piston is driven by the said crankshaft to move in the said cylinder in the alternate function of a compressor which assists the said positive displacement compressor means.

2. Claim 1 and means of circulating a secondary flow of circulating liquid, and a furnace means of heating the said secondary flow of circulating liquid by combustion of a combustible substance, and means of automatically controlling the said secondary flow of circulating liquid to heat the said boiler means when the said cooling effect is required to cause cooling of the said inside of a building during times when the sensible temperature of the said primary flow of circulating liquid is too low to heat the said boiler means sufficiently to cause the said function of a heat engine to provide sufficient power to provide the said cooling effect in sufficient quantity to keep the said inside of a building cooled to a predetermined sensible temperature, and means of selectively engaging the said means of automatically controlling the said secondary flow of circulating liquid.

3. Claim 1 and a means of mixing the vapor and any condensed liquid refrigerant exhausted from the said cylinder with vapor discharged from the said compressor means before these vapors and this liquid refrigerant are delivered to the said condenser, so that the sensible temperature of the vapors and the liquid refrigerant is equalized and evaporation of the liquid refrigerant is caused.

4. Claim 3 and an oil separator to receive the vapor and oil flowing from the said means of mixing, and means of delivering vapor from the said separator to the said condenser, and an oil sump, and means of conducting oil from the said separator to the said oil sump, and an oil pump which draws oil from the said oil sump, and means of employing oil delivered from the said oil pump for lubrication of the said piston in the said cylinder.

5. Claim 1 and a storage tank containing a quantity of liquid of the same type as the said circulating liquid, and valve means of diverting the said primary flow of circulating liquid through the said tank, and means of automatically controlling the said valve means so that at times when the said solar radiation is providing more heat than is required to maintain the said cooling effect a flow of the said primary flow of circulating liquid is diverted through the said storage tank and heat is thus stored, and means of automatically controlling the said valve means so that liquid in the said storage tank at a sensible temperature greater than the sensible temperature of the said primary flow of circulating liquid is mixed with the said primary flow of circulating liquid to cause an increase in sensible temperature of the said primary flow of circulating liquid at times when the said increase in sensible temperature is required to maintain the said cooling effect.

6. Claim 1 and the said means of exhausting the said vapor including an exhaust valve, and the said cylinder and the said exhaust valve being so located that any liquid present in the said cylinder drains out through the said exhaust valve when it is open, and the said piston having a cylindrical outer surface comprising a bearing surface with the walls of the said cylinder, and additionally the said piston having an extension of its said cylindrical outer surface in the direction of the said exhaust valve, and this said extension is relieved so that it does not contact the walls of the said cylinder but moves in close proximity to the said walls, and means of injecting a flow of oil into the space between the said extension and the said walls of the said cylinder during times when said function of a heat engine is being performed.

7. In combination, means of circulating a primary flow of circulating liquid, and means of heating the said primary flow of circulating liquid by solar radiation to a sensible temperature greater than the sensible temperature of the outside heat sink, and a boiler means of causing liquid refrigerant to boil to a vapor, and means of controlling the said primary flow of circulating liquid to heat the said boiler means, and means of introducing the said vapor into a cylinder, and the said means of introducing including an inlet valve, and a piston which is moved in the said cylinder by pressure from the said vapor when the said pressure is adequate to cause this movement, and means of connecting the said piston to a crankshaft so that the movement of the said piston under the influence of the said pressure causes rotation of the said crankshaft in the function of a heat engine, and the inside of a building maintained at a sensible temperature higher than the sensible temperature of the outside heat sink, and a condenser in which condensing occurs at a sensible temperature higher than the sensible temperature of the said inside of a building, and means of exhausting the said vapor from the said cylinder to the said condenser, and means of injecting liquid refrigerant from the said condenser into the said boiler means, and an evaporator in which refrigerant liquid evaporates at a sensible temperature lower than the sensible temperature of the outside heat sink, and means of transferring heat from the outside heat sink to the said evaporator to provide latent heat of vaporization, and means of introducing liquid refrigerant into the said evaporator from the said condenser, and means of coupling the said crankshaft to drive a positive displacement compressor means of drawing refrigerant vapor from the said evaporator, and means of discharging the vapor compressed by the said positive displacement compressor means into the said condenser, and means of circulating a fluid medium to contact the said condenser so that the said fluid medium receives a heating effect from the said condenser, and means of circulating the said fluid medium to heat the said inside of a building, and an electric motor means of driving the said crankshaft, and means of automatically controlling the said electric motor means to provide motive power to start the motion of the said function of a heat engine, and means of automatically controlling the said electric motor means to provide motive power to drive the said positive displacement compressor means when the said heating effect is required to cause heating of the said inside of a building during times when the sensible temperature in the said boiler means is too low for the said function of a heat engine to provide sufficient power to drive the said compressor means fast enough to provide the said heating effect in sufficient quantity to keep the said inside of a building heated to a pre-determined sensible temperature, and valve means of conducting vapor flow from the said evaporator through the said inlet valve into the said cylinder during the said times when the sensible temperature in the said boiler means is too low, so that the said piston is driven by the said crankshaft to move in the said cylinder in the alternate function of a compressor which assists the said positive displacement compressor means.

8. Claim 1 and means of circulating a secondary flow of circulating liquid, and a furnace means of heating the secondary flow of circulating liquid by combustion of a combustible substance, and means of automatically controlling the said secondary flow of circulating liquid to heat the said boiler means when the said heating effect is required to cause heating of the said inside of a building during times when the sensible temperature of the said primary flow of circulating liquid is too low to heat the said boiler means sufficiently to cause the said function of a heat engine to provide sufficient power to provide the said heating effect in sufficient quantity to keep the said inside of a building heated to a predetermined sensible temperature, and means of selectively engaging the said means of automatically controlling the said secondary flow of circulating liquid, and an auxiliary evaporator means of causing evaporation of liquid refrigerant to vapor by the application of heat from the said primary flow of circulating liquid when the said secondary flow of circulating liquid is being used to heat the said boiler means, and means of conducting vapor from the said auxiliary evaporator means to be compressed by the said positive displacement compressor means.

9. Claim 7 and a means of mixing the vapor and any condensed liquid refrigerant exhausted from the said cylinder with vapor discharged from the said compressor means before these vapors and this liquid refrigerant are delivered to the said condenser, so that the sensible temperature of the vapors and the liquid refrigerant is equalized and evaporation of the liquid refrigerant is caused.

10. Claim 9 and an oil separator to receive the vapor and oil flowing from the said means of mixing, and means of delivering vapor from the said separator to the said condenser, and an oil sump, and means of conducting oil from the said separator to the said oil sump, and an oil pump which draws oil from the said oil sump, and means of employing oil delivered from the said oil pump for lubrication of the said piston in the said cylinder.

11. Claim 7 and a storage tank containing a quantity of liquid of the same type as the said circulating liquid, and valve means of diverting the said primary flow of circulating liquid through the said tank, and means of automatically controlling the said valve means so that at times when the said solar radiation is providing more heat than is required to maintain the said heating effect a flow of the said primary flow of circulating liquid is diverted through the said storage tank and heat is thus stored, and means of automatically controlling the said valve means so that liquid in the said storage tank at a sensible temperature greater than the sensible temperature of the said primary flow of circulating liquid is mixed with the said primary flow of circulating liquid to cause an increase in sensible temperature of the said primary flow of circulating liquid at times when the said increase in sensible temperature is required to maintain the said heating effect.

12. Claim 7 and the said means of exhausting the said vapor including an exhaust valve, and the said cylinder and the said exhaust valve being so located that any liquid present in the said cylinder drains out through the said exhaust valve when it is open, and the said piston having a cylindrical outer surface comprising a bearing surface with the walls of the said cylinder, and additionally the said piston having an extension of its said cylindrical outer surface in the direction of the said exhaust valve, and this said extension is relieved so that it does not contact the walls of the said cylinder but moves in close proximity to the said walls, and means of injecting a flow of oil into the space between the said extension and the said walls of the said cylinder during times when said function of a heat engine is being performed.

13. In combination, a heat engine, and a boiler means of boiling a refrigerant working medium, and a condenser means of condensing refrigerant vapor to a liquid after it has been expanded in the said heat engine, and means of feeding the said liquid into the said boiler means, and means of pumping lubricating oil to bearing surfaces of components of the said heat engine, and a sump means of holding a quantity of the said lubricating oil, and means of detecting the condition of low oil level in the sump means after oil has been carried by vapor flow from the said bearing surfaces to the said condenser and then trapped in the said boiler means, and means, employed on said condition of low oil level, of causing the said means of feeding the said liquid to cease for a period of time sufficient to boil off all liquid refrigerant from the said boiler means, thus leaving only a quantity of liquid oil, and means of causing vapor to flow from the said boiler means to the said condenser means during the said period of time sufficient to boil off liquid, and means of controlling a drain valve to open at a time after the said liquid refrigerant has boiled off, and means of causing the said valve to drain the said liquid oil into an oil receiver, and a boiler pipe through which vapor flows from the said boiler means to the said heat engine, and means of providing a restricted flow drainage of the said liquid oil from the said oil receiver into the said boiler pipe, and means of separating liquid oil from refrigerant vapor and returning the said oil to the said sump means.

* * * * *